United States Patent [19]

Uehara et al.

[11] Patent Number: 5,093,049

[45] Date of Patent: Mar. 3, 1992

[54] INJECTION MOLDING METHOD WITH STAMPING COMPRESSION

[75] Inventors: Tadayoshi Uehara; Tatsuji Nakagawa, both of Kanagawa, Japan

[73] Assignee: Aida Engineering Ltd., Kanagawa, Japan

[21] Appl. No.: 474,780

[22] PCT Filed: Jul. 14, 1989

[86] PCT No.: PCT/JP89/00710

§ 371 Date: Mar. 16, 1990

§ 102(e) Date: Mar. 16, 1990

[87] PCT Pub. No.: WO90/00961

PCT Pub. Date: Feb. 8, 1990

[30] Foreign Application Priority Data

Jul. 18, 1988 [JP] Japan .................. 63-178853

[51] Int. Cl.$^5$ .......................................... B29D 11/00
[52] U.S. Cl. .................... 264/2.2; 264/40.4; 264/297.2; 264/328.7; 264/328.8; 264/328.16; 425/808
[58] Field of Search ............... 264/2.2, 40.4, 297.2, 264/328.7, 328.8, 328.16; 425/808

[56] References Cited

U.S. PATENT DOCUMENTS

| 4,091,057 | 5/1978 | Weber | 264/2.2 |
| 4,364,878 | 12/1982 | Laliferte et al. | 264/2.2 |
| 4,828,769 | 5/1989 | Maus et al. | 264/2.2 |
| 4,836,960 | 6/1989 | Spector et al. | 264/2.2 |
| 4,907,960 | 3/1990 | Hertzer | 264/2.2 |
| 4,933,119 | 6/1990 | Weymouth, Jr. | 264/2.2 |

FOREIGN PATENT DOCUMENTS 94807  4/1988  Japan ................ 264/2.2

*Primary Examiner*—James Lowe
*Attorney, Agent, or Firm*—Wenderoth, Lind & Ponack

[57] ABSTRACT

An injection molding method with stamping compression obtains an optical lens or other molded article from thermoplastic resin. A cavity is heated to a temperature at which resin can be maintained in a molten state under normal temperature. Measured and molten resin is injected into the heated cavity through a sprue part, a runner part and a gate part. After the injection, the sprue part is sealed. The injected resin is maintained in the molten state at this time. The injected resin is then hardened in the heated cavity by applying a pressure which can provide a dynamic modulus of elasticity of the resin at the normal temperature and normal pressure. The resin hardened by the pressurization is then cooled to a removal temperature while reducing the pressure so as to maintain the dynamic modulus of elasticity of the resin at the dynamic modulus of elasticity of the resin at normal temperature and normal pressure.

4 Claims, 5 Drawing Sheets

INJECTION MOLDING METHOD WITH STAMPING COMPRESSION

TECHNICAL FIELD

This invention relates to an injection molding method with stamping compression, and more particularly to an injection molding method with stamping compression most suitable for molding articles which require high molding precision and compositional homogeneity, such as optical lenses.

BACKGROUND ART

Examples of typical known art for obtaining molded articles from thermoplastic resin will be described below.

First, a cavity is preparatorily expanded to prevent the generation of weld marks on the surface of molded articles, and thermoplastic resin in a molten state, which is measured previously to a quantity required for obtaining the molded articles, is injected into the expanded cavity.

After this injection operation is completed and a gate is sealed, the thermoplastic resin injected into the cavity is cooled to a take-out temperature with a mold clamping force applied, and a molded article is obtained.

However, the method in the prior art involves the following problems.

In the case when one mold has two or more cavities, to completely equalize the ease of resin flow into the cavities is very difficult. Accordingly, much resin is injected into the cavity into which resin flow is easier than the other, and an imbalance occurs in the quantity of resin filling the cavities.

In addition, since the cavity is expanded to prevent weld marks when injection of the measured resin is completed, resin flow stops, leaving a large unfilled portion in the cavity. As a result, flow marks tend to occur along the boundary line of the filled portion and the unfilled portion.

Furthermore, photoelastic distortion occurs at a point where the flow mark generates.

Another example of prior art which is known is as follows.

First, the cavity is preparatorily expanded to prevent the generation of weld marks on the surface of a molded article, and thermoplastic resin in a molten state is injected to completely fill the cavity with the thermoplastic resin.

Then, with the gate opened, the cavity is reduced in volume, and overchanged thermoplastic resin is caused to backflow from the cavity. When the cavity is reduced to a desired volume, the gate is sealed, and the thermoplastic resin is cooled and hardened under pressure.

However, the above-mentioned example of the prior art has a problem in that due to a large quantity of backflow of the thermoplastic resin, photoelastic distortion tends to occur around the inlet of the cavity.

In addition, both the former and latter examples have the following problems.

Though when the thermoplastic resin is cooled from the molten state of a high temperature and hardened, its dynamic modulus of elasticity varies and the resin becomes hard, the dynamic modulus of elasticity does not vary linearly throughout the temperature range during cooling. Rather, the dynamic modulus of elasticity abruptly varies at a certain temperature (glass transition point, Tg).

Because of this characteristic, if there are temperature differences from part to part when the resin temperature goes through the glass transition point while being cooled, there will be a portion where the resin is in the solidified state and a portion where the resin is in the molten state. In the conventional molding method, no special consideration is given to the temperature differences from part to part in the resin, and the process proceeds to the compression process. As a result, the portion in the solidified state tends to cause plastic deformation and the internal composition tends to become heterogeneous.

OBJECTS OF THE INVENTION

The object of the present invention is to solve the above-mentioned problems.

In particular, the present invention provides an injection molding method with stamping compression characterized by being free of imbalance in the quantity of resin to be filled in a plurality of cavities occurring due to preparatory expansion of the cavities for preventing weld marks at the time of injection.

In addition, the present invention provides an injection molding method with stamping compression free of the generation of flow marks or photoelastic distortion due to stopping of resin flow with a large unfilled portion remaining in the cavity when the injection operation completed.

In addition, the present invention provides an injection molding method with stamping compression free of the generation of photoelastic distortion resulting from the backflow of a large quantity of resin from the cavity when the cavity shrinks.

Further, the present invention provides an injection molding method with compression capable of preventing the internal composition of molded articles from becoming heterogeneous and preventing plastic deformation of a portion where the solidification occurs quickly, by preventing the presence of a portion of resin in a solidified state and a portion of resin in a molten state together due to temperature difference in the resin when the resin is cooled and passes through the glass transition point to the low temperature side.

SUMMARY OF THE INVENTION

In the injection molding method with stamping compression according to the present invention, the volume of one or more than one cavity formed in the mold is previously expanded to a volume which is more than the sum of the volume of the article to be molded and a volume of molding shrinkage due to cooling of the thermoplastic resin and which is a volume sufficient for preventing divided flow of resin flowing into the cavities, and the temperature is controlled to a level required for maintaining the injected resin in a flowing state.

A plurality of cavities may be provided in a single mold apparatus.

The resin to be injected is preparatorily measured by a measuring injection means, e.g., an injection plunger or the like. In this preparatory measuring, molten thermoplastic resin of a quantity more than that required for obtaining a desired molded article is measured.

The thermoplastic resin thus measured is injected into one or more cavities formed in a mold. No divided flow occurs in the resin flowing into the cavities, and accordingly no weld mark is generated, because the cavity is expanded and the cavity temperature is maintained at the flow temperature of the resin or higher.

The cavity begins to shrink before the completion of the injection operation of the resin, and the cavity shrinking operation and resin injection speed are controlled so that no unfilled portion which is large enough to generate a flow mark remains in the cavity when the cavity is reduced to a volume equal to the sum of the volume of the article to be molded and a volume of molding shrinkage due to the cooling of the thermoplastic resin.

The injection pressure of the resin is lowered to the retaining pressure which does not obstruct backflow from the cavity of the resin likely to be overcharged to the cavity due to the cavity contraction and which allows the injection of the resin into any unfilled portion likely to remain in the cavity when the cavity is contracted at least to a volume equal to the sum of the volume of the molded article and a volume of molding shrinkage due to the cooling of the thermoplastic resin.

Accordingly, at this point, the internal pressure of the cavity in which the resin is slightly overcharged is higher than the retaining pressure, and therefore slightly overcharged resin backflows due to the pressure difference with the retaining pressure.

On the other hand, to the cavity having a slightly unfilled portion, the resin keeps flowing by the resin retaining pressure and backflow pressure from the other cavity.

When the volume of the cavity is contracted to a value equal to the sum of the volume of the molded article and a volume of molding shrinkage due to the cooling of the thermoplastic resin in the cavity and behavior of the resin in the cavity becomes stable, the sprue is sealed, and all cavities are filled with the resin of the quantity determined by taking into account the molding shrinkage due to cooling.

As already mentioned, thermoplastic resin has a character in that its dynamic modulus of elasticity increases with cooling down and the resin is hardened. Particularly, when it goes through the glass transition point, its dynamic modulus of elasticity abruptly varies. In addition to such a character, resin has a characteristic that its dynamic modulus of elasticity increases by increasing the pressure even if the temperature is the same, and its glass transition point shifts to the higher temperature side.

This means that thermoplastic resin is easily hardened at a high temperature (temperature, e.g., 130° C., at which acrylic resin is in a flow state under normal pressure) correspondingly when a high pressure is applied.

The present invention utilizes such characteristics of thermoplastic resin.

When the sprue is sealed, the temperature in the cavity is maintained at a temperature at which the resin keeps a fluid state under normal pressure, and the resin in the cavity is in such a condition that pressure can be transmitted uniformly to the entire portion.

If a mold clamping force is applied to the cavity in this condition, the resin in the cavity increase its dynamic modulus of elasticity without an accompanying temperature decrease.

According to the present invention, by applying a pressure which can provide the dynamic modulus of elasticity of the resin at normal temperature and normal pressure to the resin in the cavity after the sprue is sealed, the resin can be hardened without a temperature drop or with a slight temperature drop.

The resin, whose dynamic modulus of elasticity is increased by applying pressure, is cooled in the cavity.

As described above, thermoplastic resin has a characteristic in that its dynamic modulus of elasticity increases when cooled. Accordingly, by decreasing the compression force as the resin is cooled, the resin in the cavity is cooled down to a take-out temperature while maintaining the dynamic modulus of elasticity of the resin in the cavity to the dynamic modulus of elasticity at the time of normal temperature and normal pressure.

When the resin in the cavity is cooled to the take-out temperature, the resin forms a complete molded article. Then the molded article is taken out by opening the cavity.

BEST MODE FOR CARRYING OUT THE INVENTION

Figure 1:
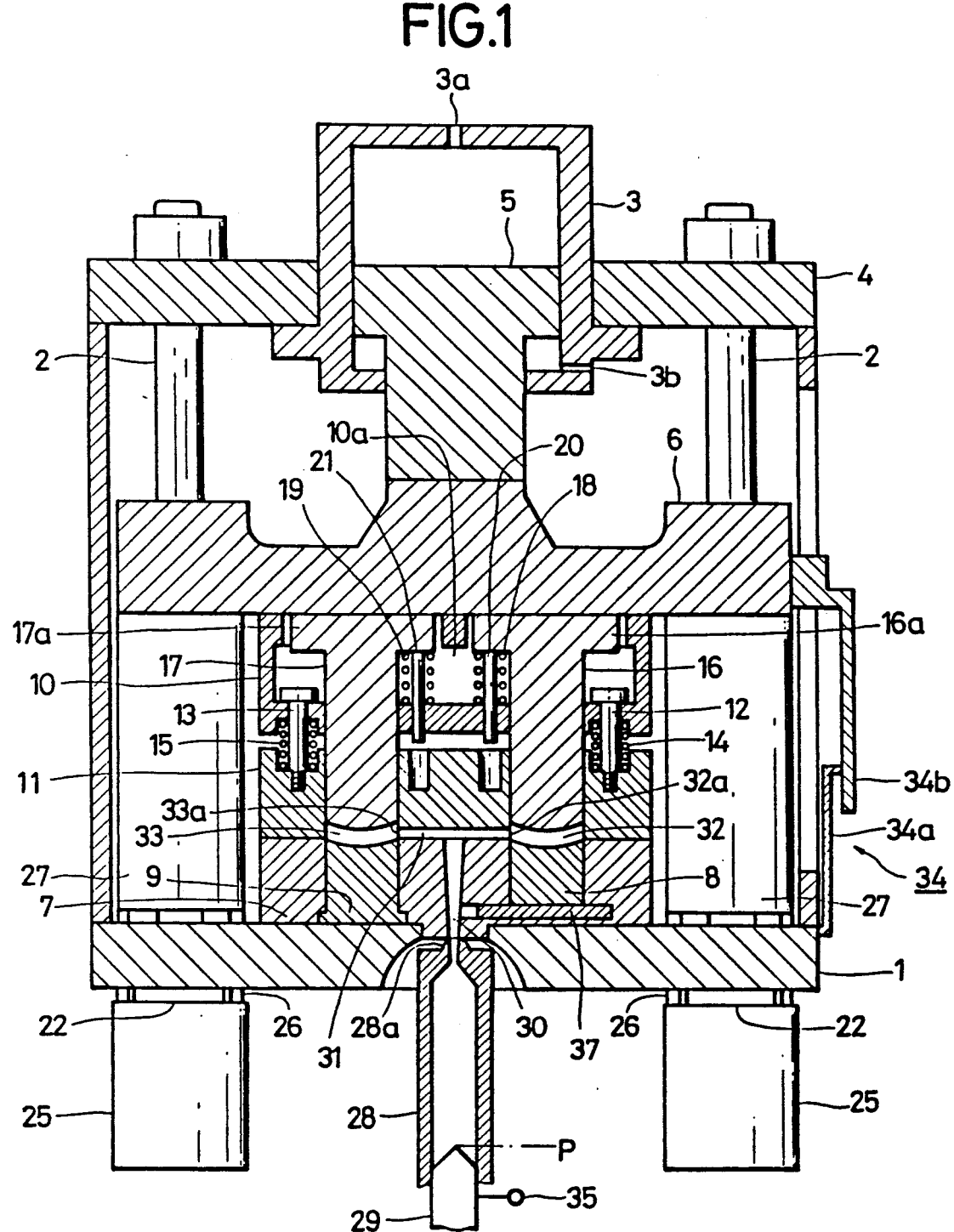
FIG. 1 is a sectional view of a injection molding apparatus with direct pressure stamping compression to be used in the present invention, cut away along the center line of a mold clamping cylinder.
Figure 2:
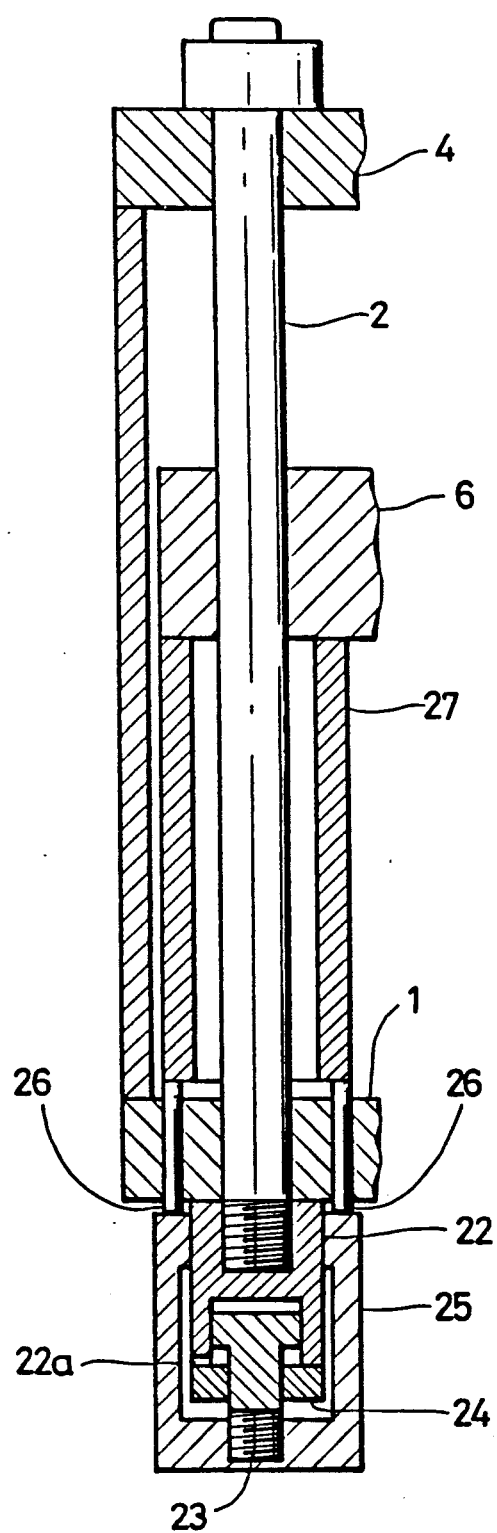
FIG. 2 is a sectional view of the injection molding apparatus with stamping compression shown in FIG. 1, cut away along the center line of a tie bar.

FIGS. 1 and 2 show an example of an injection molding apparatus with stamping compression to be used for molding in accordance with the method of the present invention.

On the upper end of tie bars 2, planted at four corners of a fixed plate 1, a cylinder fixing plate 4, on which a mold clamp cylinder 3 is attached, is unmovably installed.

To the end of a piston 5 of the mold clamp cylinder 3 is fixed a movable plate. This movable plate 6 ascends and descends along the tie bars 2 as the piston 5 advances and retracts.

On the top face of the fixed plate 1, a lower mold plate 7, is fixed, and in the lower mold plate 7 lower mold inserts 8 and 9 are contained.

On the bottom face of the movable plate 6 is fixed an upper mold suspension member 10.

An upper mold plate 11, being in contact with the lower mold plate 7, is suspended from the upper mold suspension member 10 by bolts 12 and 13. A compression spring 14 provided around the bolt 12 and a compression spring 15 provided around the bolt 13 produce a departing force between the upper mold suspension member 10 and upper mold plate 11.

Upper mold inserts 16 and 17 are provided in the upper mold plate 11 at points just above the lower mold inserts 8 and 9, respectively, in a manner permitting ascent and descent.

Head flanges 16a and 17a of the upper mold inserts 16 and 17 exist in an internal space 10a of the upper mold suspension member 10. The head flanges 16a and 17a are supported in the internal space 10a of the upper mold suspension member 10 by compression springs 18 and 19, respectively, and the top end faces of the head flanges 16a and 17a are in contact with the bottom face of the movable plate 6.

Inside the compression springs 18 and 19 are provided return pins 20 and 21, respectively, to guide the compression springs 18 and 19.

As detailed in FIG. 2, an auxiliary cylinder 22 is screwed to the bottom end of each tie bar 2, and the end of a piston 23 of the auxiliary cylinder 22 penetrates a lower flange 24 and is screwed to a bottom cylindrical case 25.

On the top end face of the case 25, a pin 26 is installed vertically. This pin 26 passes through a through hole formed in the fixed plate 1, and can ascend and descend.

A vertically long spacer ring 27 is disposed around the tie bar 2, and the bottom surface of the spacer ring 27 is supported by the pin 26.

In an injection cylinder 28 for measuring and injecting molten resin, a plunger 29 is provided. The plunger 29 advances and retracts in the injection cylinder 28 by a driving mechanism, e.g., a hydraulic cylinder (not shown).

A nozzle 28a of the injection cylinder 28 is depressed to a sprue 30 of the lower mold plate 7 by cylinders (not shown), and the sprue 30 is connected to a gate 32a of a cavity 32 and a gate 33a of a cavity 33 through a runner 31 formed on junction surfaces of the lower mold plate 7 and the upper mold plate 11.

A fixed member 34a fixed to the fixed plate 1 and a moving member 34b fixed to the movable plate 6 together make a position sensor 34 for detecting the position of the movable plate 6.

More particularly, the fixed member 34a and the moving member 34b make, for example, a potentiometer, and as the movable plate 6 ascends or descends the relative distance of the moving member 34b from the fixed member 34a varies. Since the position of the fixed member 34a is fixed, the output of the position sensor 34 primarily shows the position of the movable plate 6.

As the movable plate 6 ascends or descends, the upper die inserts 16 and 17 ascend or descend. Since the volumes of the cavities 32 and 33 are determined according to the ascending and descending positions of the upper mold inserts 16 and 17, the output of the position sensor 34 eventually indicates the volumes of the cavities 32 and 33.

The reference number 35 denotes a position sensor for indicating the position of the plunger 29. Though the position sensor 35 primarily indicates the position of the plunger 29, the difference between the present position of the plunger during injection and the initial position P corresponds to the quantity of injected resin, based on the premise that the plunger initial position P at the time of completion of the preparatory measurement is fixed. Accordingly, the quantity of injected resin can be known from the output of the position sensor 35.

Now, referencing the above information, the operation to form a minus lens from acrylic resin according to the method of the present invention will be described.

Figure 3:
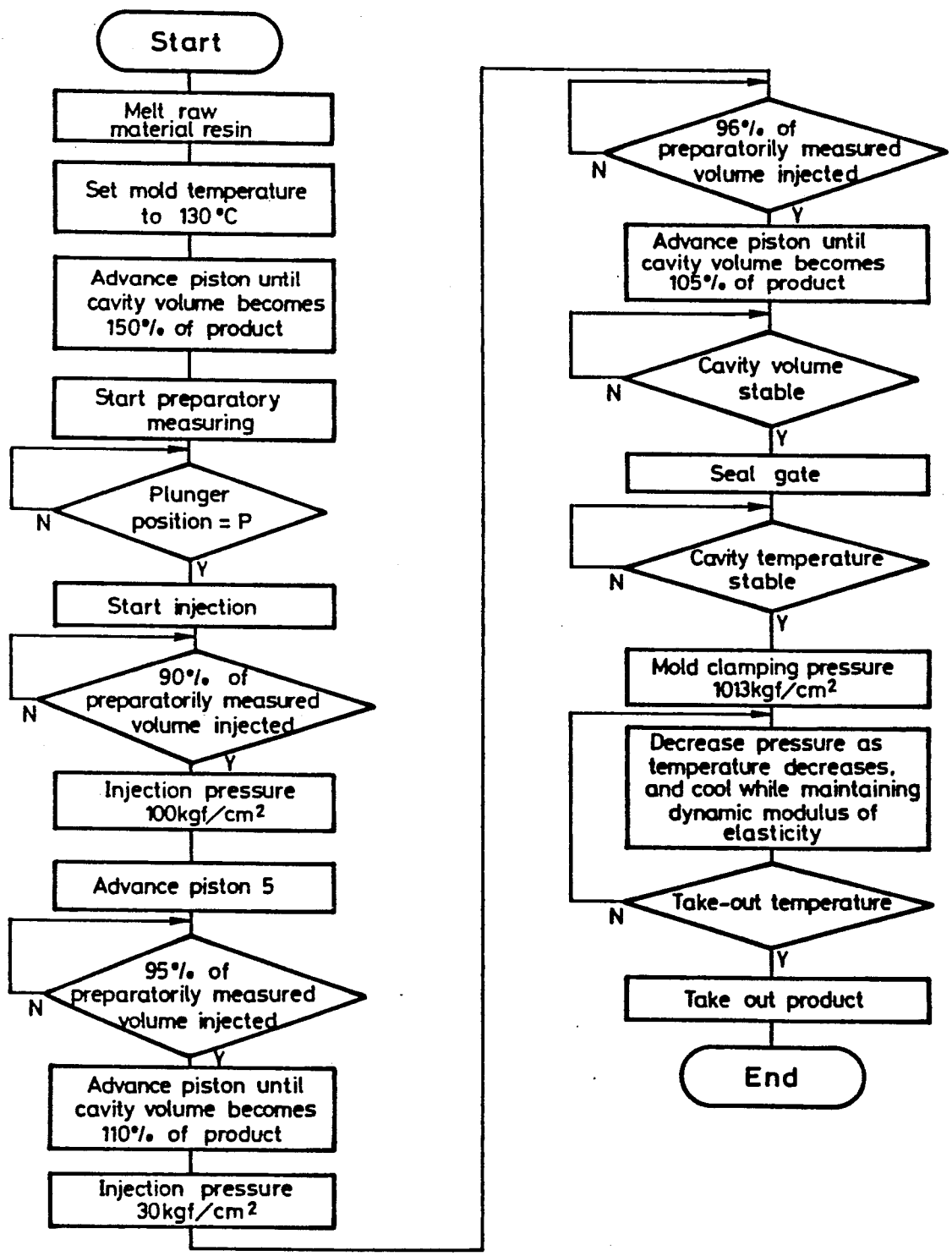
FIG. 3 is a flowchart showing the operation of the present invention.

FIG. 3 (flowchart) will facilitate understanding of the present invention.

First, acrylic resin (raw material) is heated and is in a molten state.

In addition, the temperature in the cavities 32 and 33 is adjusted to 130° C. at which acrylic resin can maintain flow condition under normal pressure.

Further, a hydraulic circuit connected to the port 22a of the auxiliary cylinder 22 is not closed, and the piston 23 is ready to be ascended or descended by an external force. In other words, the auxiliary cylinder 22 is in the condition that the lowering of the movable plate 6 is not interfered with by this cylinder.

When oil is supplied to a port 3a of the mold clamp cylinder 3 after the initial setting, the piston 5 advances and lowers the movable plate 6.

As the movable plate 6 descends, the upper mold suspension member 10 also descends, and the upper mold plate 11 also descends via the bolts 12 and 13. The upper mold plate 11 and the lower mold plate 7 are joined by the departing force of the compression springs 14 and 15 created between the upper mold suspension member 10 and the upper mold plate 11.

In addition, since the bottom face of the movable plate 6 and the upper flanges 16a and 17a of the upper mold inserts 16 and 17 are in contact with each other, when the movable plate 6 descends, the upper mold inserts 16 and 17 also descend.

As the upper mold inserts 16 and 17 descend, the volumes of the cavities 32 and 33 decrease, and eventually the volumes of the cavities 32 and 33 are reduced to a value equal to 150% of the volume of the lens to be molded. The value "150%" is a volume required for not generating divided flow for acrylic resin flowing into the cavities 32 and 33, and varies according to the shapes and fluidity of the resin. It is also required that the volumes of the cavities 32 and 33 can store acrylic resin of a quantity greater than that required for molding the lens.

The volumes of the cavities 32 and 33, varying as the movable plate 6 descends, can be known by the position sensor 34. When the output of the positioin sensor 34 indicates the reduction of the volumes of the cavities 32 and 33 to 150% of the volume of the lens to be molded at normal temperature and normal pressure, the auxiliary cylinder 22 operates to fix the volumes of the cavities 32 and 33 in that position.

More particularly, the hydraulic circuit connected to the port 22a of the auxiliary cylinder 22 is shut off by a shut-off valve or the like, and as a result the position of the piston 23 is fixed. Since a pin 26 and a spacer ring 27 are mounted on the top of the cap 25 connected to this piston 23, fixing of the position of the piston 23 interferes with lowering of the spacer ring 27.

As a result, since the spacer ring 27 supports the movable plate 6 in that position, the volumes of the cavities 32 and 33 are fixed. As this time, the propelling force of the mold clamp cylinder 3 is also controlled so as to fix the volumes of the cavities 32 and 33.

In this manner, when the volumes of the cavities 32 and 33 are fixed to a volume equal to 150% of the volume of the lens to be molded at normal temperature and normal pressure, a preparatory measuring operation is performed by the injection cylinder 28.

First, when resin is loaded into the injection cylinder 28 from a screw mechanism or other mechanism (not shown), the plunger 29 retracts within the injection cylinder 28. The amount of retraction of the plunger 29 corresponds to the amount of resin flowing into the injection cylinder 28, and the amount of retraction of the plunger 29 can be known by the position sensor 35.

When the plunger 29 is retracted to the position P, acrylic resin of a quantity more than required for obtaining a molded lens is stored in the injection cylinder 28.

When the output of the position sensor 35 indicates that the plunger 29 has retracted to the position P, the preparatory measuring operation ends, and the injection operation starts.

The injection operation of resin is performed by raising the plunger 29.

When the plunger 29 ascends in the injection cylinder 28 by means of a hydraulic cylinder or the like (not shown), acrylic resin stored in the injection cylinder 28 by the preparatory measuring operation starts to flow into the cavities 32 and 33 through the route of the nozzle 28a-sprue 30-runner 31-and gates 32a and 33a.

At this time, since the temperature in the cavities 32 and 33 is set to 130° C., at which the acrylic resin (material) is maintained in a flowing state, acrylic resin flowing into the cavities 32 and 33 is kept in a flowing state.

In addition, at this time the volumes of the cavities 32 and 33 are expanded to a volume equal to 150% of the volume of the lens to be molded at the normal temperature and normal pressure, and injected resin flows into the cavities 32 and 33 without being divided. Accordingly, no weld mark is generated. At this time, the quantities of resin flowing into the cavities 32 and 33 are not always the same, and more resin flow into the cavity of smaller fluid resistance.

As the injection operation progresses, the output of the position sensor 35 varies, and the quantity of the injected resin can be known by the output of the position sensor 35.

By the way, when the volumes of the cavities 32 and 33 are reduced after total quantity of preparatorily measured resin (more than that required for obtaining a molded article) is injected, a large amount of backflow of resin from the cavities 32 and 33 occurs owing to the mold clamping action, and photoelastic distortion occurs around the gates 32a and 33a of the cavities 32 and 33.

According to the present invention, in order to prevent the generation of a large amount of backflow at the time of mold clamping, a large amount of overcharge to the cavities 32 and 33 is prevented by lowering the upper mold inserts 16 and 17 before completion of the injection operation of resin and reducing the volumes of the cavities 32 and 33.

On the other hand, if the volumes of the cavities 32 and 33 are reduced in the early stage of the injection operation, a divided flow of resin occurs in the cavities 32 and 33 and a weld line is generated at the junction of the divided flow.

According to the present invention, the reduction operation of the volumes of the cavities 32 and 33 is so timed that it is performed when the resin has flowed into the cavities 32 and 33 to the extent that a weld line does not occur even when the volumes of cavities 32 and 33 are reduced.

A proper timing of reducing the volumes of the cavities 32 and 33 varies according to the character of the resin the shape of the cavities 32 and 33, and so on.

For example, in the case of forming a minus lens from acrylic resin, it is desirable to start reduction operation of the cavity volume after the front end of the resin flowing into the cavities 32 and 33 has passed the position of the optical axis of the lens (i.e., after the front end of flowing resin has completely passed the narrowest part of the thicknesses of the cavities 32 and 33). In addition, for determining the start timing of the reduction of the cavity volume, the difference in ease of flow between the cavities 32 and 33 must be taken into account.

In FIGS. 4 thru 7, the assumption has been made that the cavity 32 (right side) is smaller in fluid resistance than the cavity 33 (left side) and is easier for resin to flow into. The figures of percentage used in these figures denote the ratio of the volumes of the cavities 32 and 33 to the volume of the lens to be molded.

Figure 4:
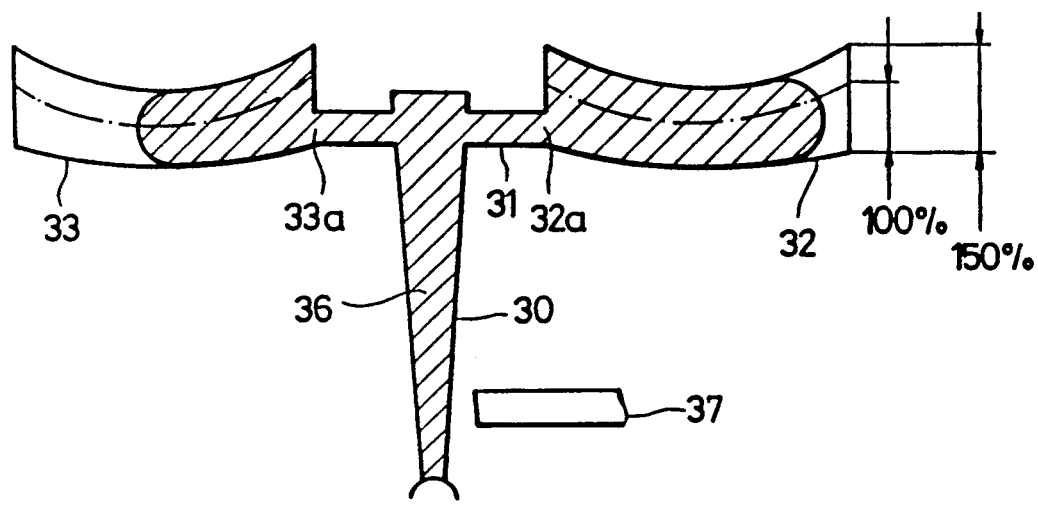
FIG. 4 is a view showing the appearance of the cavities when 90% of preparatorily measured resin is injected.
Figure 5:
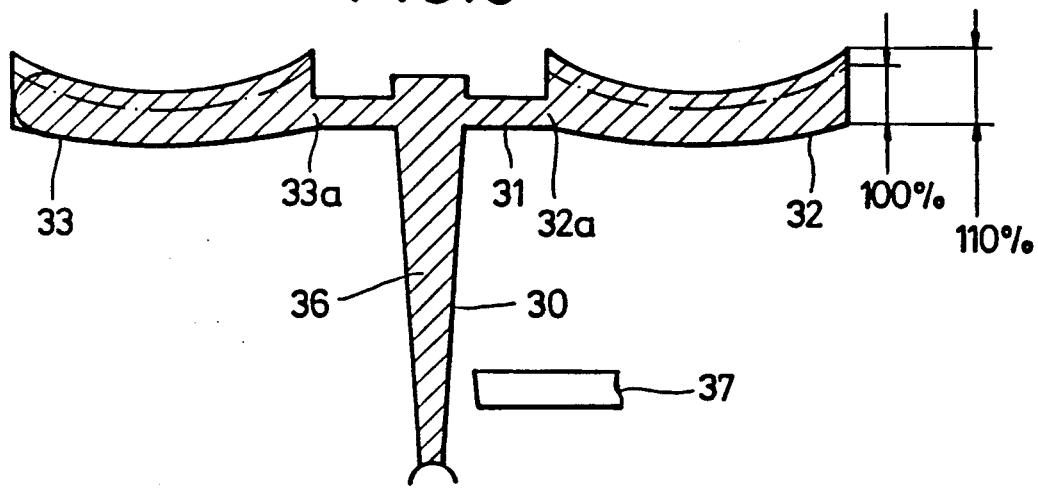
FIG. 5 is a view showing the appearance of the cavities when 95% of the preparatorily measured resin is injected.

First, FIG. 4 shows the state when the front end of resin 36 flowing into the cavity 33, which has greater fluid resistance and accordingly resin flow into which is harder, passes the optical axis position.

The cavity volume reduction operation is started after the output of the position sensor 35 indicates that the injection operation has progressed to the extent that resin of the quantity equal to 90% of preparatorily measured resin is injected, provided it has been verified by trial operations that the state in the cavities 32 and 33 is as shown in FIG. 4 when the injection operation progresses to the extent that resin of the quantity equal to 90% of preparatorily measured resin is injected. The injection operation of resin 36 continues while this cavity volume reduction operation is being performed.

For the cavity volume reduction, first the hydraulic circuit of the port 22a of the auxiliary cylinder is opened.

When the hydraulic circuit connected to the port 22a is not closed, the lowering of the spacer ring 27, pin 26, case 25, and piston pin 23 is possible and movable plate 6 is not obstructed. Though the auxiliary cylinder 22 is not mentioned in the following, the hydraulic circuit of the auxiliary cylinder 22 is opened at the time of advance of the mold clamp cylinder 3, and the hydraulic circuit of the auxiliary cylinder is closed at the time of fixing the cavity position.

As the upper mold inserts 16 and 17 are lowered by supplying oil to the port 3a of the mold clamp cylinder 3, the volumes of the cavities 32 and 33 are reduced.

At this time, the injection pressure of the resin by the plunger 29 is lowered to 100 kgf/cm$^2$. The meaning of this injection pressure "100 kgf/cm$^2$" will be described in detail later.

By the continuous supply of resin from the injection cylinder 28 and the reduction of the volumes of the cavities 32 and 33, the resin 36 having flowed into the cavities flows deeper into the cavities 32 and 33.

The injection operation of resin by the plunger 29 at the injection pressure 100 kgf/cm$^2$ is performed together with the volume reduction operation of the cavities 32 and 33 by the mold clamp cylinder 3, and it is controlled so that the volumes of the cavities 32 and 33 are reduced to 110% of the volume of the lens to be molded when 95% of the preparatorily measured resin has been injected.

The value 110% varies according to the character of resin used and the shape of the cavity, and it is not a fixed value. Now, the meaning of 110% and the meaning of 100 kgf/cm$^2$ (injection pressure) will be described in detail.

Assume that the volume of the lens to be molded is 100%, the retaining pressure to stabilize the quantity of resin flowing between the cavities 32 and the 33 is 30 kgf/cm$^2$, and molding shrinkage rate of the lens due to cooling from the condition with this retaining pressure applied to 5%, then when the entire injection operation is finished and the sprue is sealed by the sprue cutter 37, the volume of the cavities 32 and 33 needs to be 105% of the volume of the lenses, to be molded. And, for example, assume that when 95% of preparatorily measured resin (FIG. 5) is injected, the cavity 32 is completely filled, then the cavity 32 is in the condition of overcharge by the amount corresponding to the volume equivalent to the difference (5%) of 110% and 105% of difference (70 kgf/cm$^2$) of injection pressure 100 kgf/cm$^2$ and retaining pressure 30 kgf/cm$^2$.

Accordingly, when the volume of the cavity 32 is reduced to a volume equivalent to 105% of the volume of the lens to be molded (volume with molding shrinkage due to cooling being considered), overcharged resin backflows from the cavity 32. When the amount of backflow exceeds a certain allowable value, photoelastic distortion occurs in the vicinity of the gate 32a of the cavity 32. The value 110% related to a volume and the value 100 kgf/cm$^2$ related to pressure are determined so that the amount of the backflow occurring when the injection pressure is decreased to retaining pressure of 30 kgf/cm$^2$ and the volume of the cavity 32 is reduced to a volume equivalent to 105% of the volume of the lens to be molded does not exceed the, allowable value.

Similarly, it is said that the volumes of the cavities 32 and 33 are reduced to a volume equivalent to 110% of lenses to be molded when 95% of preparatorily measured resin is injected. The value "95%" is variable according to the character of resin used and cavity shape.

The meaning of the value 95% will be described in more detail.

Due to the difference in the ease of resin flow between the cavities 32 and 33, when the volumes of the cavities 32 and 33 are reduced to 110% of the volume of the lens to be molded, the cavity 33 would have an unfilled portion even if the cavity 32 is filled completely.

At this time, since the cavity 32 is completely filled, a large internal pressure is generated in the cavity 32, and its fluid resistance increases abruptly, while the fluid resistance of the cavity 33 having an unfilled portion has only a small fluid resistance. As a result, after the cavity 32 is completely filled, a greater part of the injected resin flows into the cavity 33.

In addition, in the process of reducing the volumes of the cavities 32 and 33 to a volume equivalent to 105% of the lens to be molded including the molding shrinkage, resin backflowed from the cavity 32 and resin injected from the injection cylinder 28 flow into the cavity 33. As a result of the flow of resin into the cavity 33 and the volume reduction of the cavity 33 itself, unfilled portions in the cavity 33 are filled with resin.

However, when the unfilled portion remaining in the cavity 33 at the time when the volume of the cavity 33 is reduced to a volume equivalent to 110% of the volume of the lens to be molded is larger than a certain value, an unfilled portion remains in the cavity 33 when the volume of the cavity 33 is reduced to a volume equivalent to 105% of the volume of the lens to be molded.

Accordingly, when the maximum value of difference in ease of resin flow between cavities 32 and 33 is considered, the value of "95%" is determined so as to be in the range where the cavity 32 of easy resin flow is not overcharged to cause photoelastic distortion, and the cavity 33 of difficult resin flow does not have an unfilled portion at the time when the volume of the cavities is reduced to the volume equivalent to 105% of that of the lens to be molded.

Now, when the position sensor 35 detects the injection of resin in the amount equivalent to 95% of preparatorily measured resin, the mold clamp cylinder 3 is controlled so that the volumes of the cavities 32 and 33 become a volume equivalent to 110% of the volume of the lens to be molded, and the injection pressure of resin by the plunger 29 is lowered to 30 kgf/cm$^2$.

Accordingly, with the injection pressure of 30 kgf/cm$^2$, the resin injection operation continues.

When the amount of injected resin exceeds 95% of preparatorily measured amount of resin and reaches 96% of the amount of preparatorily measured amount of resin, the amount of oil to be supplied to the port 3a of the mold clamp cylinder 3 is further increased and the volumes of the cavities 32 and 33 are reduced to a volume equivalent to 105% of the volume of the lens to be molded.

Figure 6:
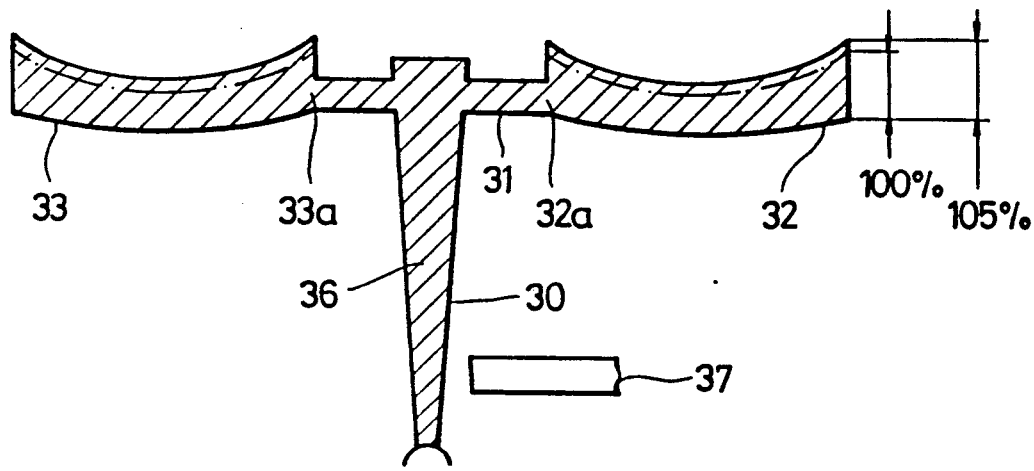
FIG. 6 is a view showing the appearance of the cavities when 96% or more of the preparatorily measured resin is injected.
Figure 7:
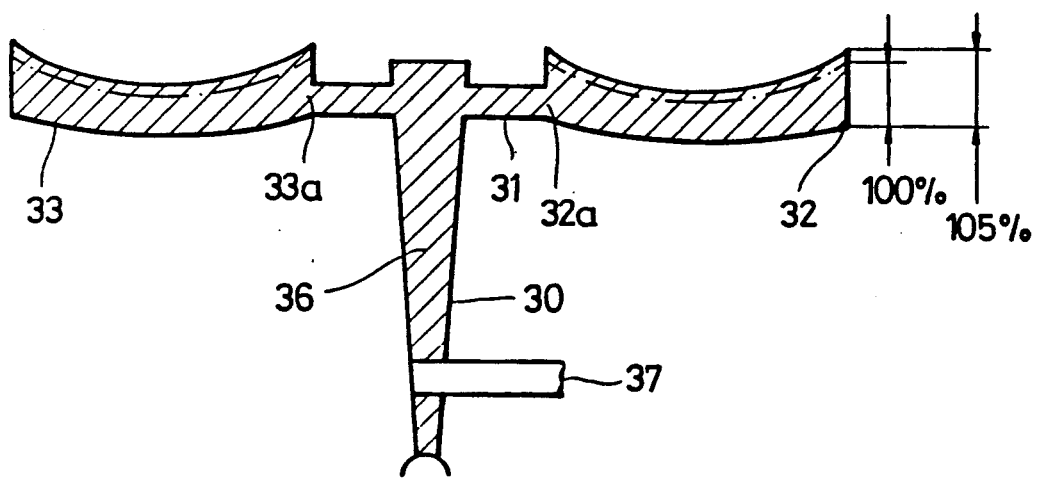
FIG. 7 is a view showing the appearance of the cavities after a gate is sealed.

As shown in FIG. 6, in the process in which the volumes of the cavities 32 and 33 are reduced to a volume equivalent to 105% of the volume of the lens to be molded, overcharged resin backflows from the cavity 32.

At the same time, the unfilled portion which remained when the volume is equivalent to 110% of the volume of the lens to be molded is filled with resin by the reduction of the volume of the cavity 33 and with resin flowing by backflow pressure from the cavity 32 and by the injection pressure of 30 kgf/cm$^2$ from the injection cylinder 28. The cavity 33 is also filled completely when the volume of the cavities 32 and 33 reaches 105% of the volume of the lens to be molded.

The injection pressure 30 kgf/cm$^2$ is the aforementioned retaining pressure. This retaining pressure does not obstruct the backflow from the overcharged cavity 32, and it is a pressure which can urge resin flow to the cavity 33 in which an unfilled portion remains. It varies according to the shapes of the cavities 32 and 33 and the character of the resin.

Now, at the time when the volume of the cavities 32 and 33 are reduced to a volume equivalent to 105% of the volume of the lens to be molded, both the cavities 32 and 33 are filled with resin completely, and it is possible that a greater pressure than the injection pressure 30 kgf/cm$^2$ is generated in the cavities 32 and 33 by filling of resin.

When this condition has continued for a certain period of time (this time varies according to the fluidity of the resin and the shape of the cavity, but is normally several seconds), internal pressures of the cavities 32 and 33 are balanced.

After the lapse of time required for the balancing of the internal pressures (or when the internal pressures of the cavities 32 and 33 are directly detected and both values detected are in balance with the retaining pressure of 30 kgf/cm$^2$), the sprue cutter 37 is caused to enter the sprue 30, and the resin injection operation is brought to end.

After the completion of the injection operation, the stamping process starts.

First, temperature in the cavities 32 and 33 is set to 130° C. throughout the process of the injection operation. At the temperature of 130° C., resin is kept in a flow state.

Accordingly, though injected resin is cooled to 130° C. (temperature of molding apparatus) through the heat exchange with the molding apparatus, the resin in the cavities 32 and 33 maintains a fluid condition, and a condition wherein the pressure is uniformly applied.

Therefore, when a pressure of 1013 kgf/cm$^2$ is applied to the resin in the cavities 32 and 33 by supplying oil to the port 3a of the mold clamp cylinder 3, this pressure is applied to the resin in the cavities 32 and 33 uniformly.

As mentioned already, thermoplastic resin is characterized in that its dynamic modulus of elasticity increases and the resin is hardened as the resin is cooled, and the dynamic modulus of elasticity also increases and the resin is hardened when pressure is applied.

The above-mentioned 1013 kgf/cm$^2$ is a pressure which can provide a dynamic modulus of elasticity of the resin at normal temperature and normal pressure (naturally the dynamic modulus of elasticity exceeding that of glass transition point of acrylic resin) even when acrylic resin (material) is at a temperature as high as 130° C. The value of this pressure is established according to the kind and temperature of the resin.

When resin which is in a fluid state under normal pressure is hardened by pressurizing to the pressure which gives a dynamic modulus of elasticity equal to that of the resin at a normal temperature and under normal pressure, molded articles are excellent in compositional homogeneity, because temperature differences do not occur when the resin in the process of hardening passes through the glasss transition temperature.

The resin hardened by pressurization is cooled in the mold. By controlling the pressure of the mold clamp cylinder 3a as the resin is cooled, the resin is cooled to 95° C., which is a take-out temperature, while maintaining the dynamic modulus of elasticity to that of the resin at normal temperature and under normal pressure.

Pressure control during this process is performed in the manner as shown below.

First, the pressure which gives the dynamic modulus of elasticity equal to that of resin at a normal temperature and normal pressure is determined, primarily by the temperature of the resin, and as the resin temperature decreases, the pressure which gives the modulus of electicity equal to that at a normal temperature and under normal pressure decreases. Therefore, in this embodiment, the pressure applied to the resin by the mold clamp cylinder 3a is decreased so as to cancel out the increase of the dynamic modulus of elasticity of the resin is cooled.

When the resin is cooled to 95° C. (take-out temperature), the movable plate 6 is raised by supplying oil to the port 3b of the mold clamp cylinder 3, and the lens is taken out by opening the junction of the lower mold plate 7 and the upper mold plate 10.

Minus lenses of an average mass of 18.430 g and a diameter of 70 mm were molded from acrylic resin by the method according the the present invention, and a comparison with similar lenses molded according to the conventional method was made. The results are as follows:

(1) Difference in charge quantity between cavities (left and right) when two cavities were provided in the mold apparatus.

Average difference was 4.9% in the case of the conventional method while it was 0.5% in the case of the method according to the present invention.

(2) Photoelastic distortion

Double refraction, which is a result of photoelastic distortion, was compared. The double refraction of lenses in accordance with the conventional method was 200 nm/cm, whereas that of lenses in accordance with the present invention was 20 nm/cm.

(3) Flow mark generation

Flow mark generation for entire moldings was 3.0% in the conventional method, while it was 1.0% in the molding method of the present invention.

As shown above, the molding method of the present invention can sufficiently be employed in the molding of products whose precision and stable molding is considered difficult, such as nonspherical optical lens.

The essence of this invention is to prevent the generation of weld mark due to flow resistance by injecting resin into the cavity which is expanded to a volume more than the volume obtained by adding a volume of an article to be molded and molding shrinkage resulted from the cooling of the resin and a volume sufficient for preventing divided flow of resin and is set to a temperature higher than that required for maintaining a flow state of the resin, to prevent an imbalance of the quantity of resin flowed into different cavities by reducing the volume of the cavities before the total quantity of preparatorily measured resin is injected. to prevent generation of photoelastic distortion and a flow mark by preventing stop of resin flow in the cavities by controlling the injection pressure, injection quantity, and cavity volume in the reduction process of cavity volume; and to maintain compositional homogeneity of the molded article and prevent plastic deformation by reducing the temperature difference when the resin passes the glass transition point by hardening the resin in a flow state after completion of injection by only applying a pressure which gives a dynamic modulus of elasticity equal to that of the resin at a normal temperature and under normal pressure. It goes without saying that various numerical conditions must be determined properly depending on the kind of resin, the shape of the articles, and other factors.

Although an embodiment with regard to molding minus lenses from acrylic resin has been described, it is apparent that the method of the present invention is applicable not only to plus lenses, but also to molded articles other than lenses.

According to the so far described present invention, the cavity volume is expanded to a volume capable of preventing divided flow of resin during the period from the start of injection at least to the time when the front end of the resin flowing into the cavity passes the narrowest portion of the cavity thickness, and the cavity temperature is set at a level higher than the temperature at which the resin can maintain a fluid state during the period from the start of injection to the completion in injection. Therefore, generation of weld marks can be prevented.

In addition, according to the present invention, the cavity volume reduction operation is started after the injection process has been advanced to the extent to prevent generation of weld marks and before the total quantity of the preparatorily measured resin in injected. And the injection pressure and injection quantity are controlled so that an unfilled portion does not remain in the cavity and an excessively large overcharge does not occur, while the cavity is reduced to a volume including the amount of shrinkage for the object volume, i.e., the volume of the product. In this manner, imbalance in the quantity of resin injected among a plurality of cavities can be prevented.

In addition, according to the present invention, since resin being injected is in a flow state and resin flow does not stop until the resin of a desired amount is injected, generation of photoelastic distortion and a flow mark caused by resin flow stop can be prevented.

In addition, according to the present invention, heterogeneity of internal plastics does not occur, because the resin is at a temperature capable of maintaining the flow state at the time of completion of the injection operation, and the resin is hardened by pressuring, and therefore temperature difference do not occur when the resin passes the glass transition point int eh process where the resin goes from the fluid state to the solid state and is hardened. In addition, by lowering the pressure so as to cancel out the increase of the dynamic modulus of elasticity due to cooling in the later cooling process, the dynamic modulus of elasticity of the resin being cooled is maintained at the dynamic modulus of elasticity of the resin at normal temperature and normal pressure, and plastic deformation in the resin can be prevented. Accordingly, the generation of photoelastic distortion caused by plastic deformation and heterogeneity in the resin can be prevented.

What is claim is:

1. An injection molding method with stamping compression, wherein plasticized thermoplastic resin is injected into a mold cavity through a spruce, a runner, and a gate, and cooled with a mold clamping force applied to manufacture a molded article, comprising:

heating said cavity to a temperature at which the thermoplastic resin can be maintained in a molten state under normal pressure;

measuring at least a quantity of molten thermoplastic resin required for obtaining the article to be molded;

injecting the measured and molten thermoplastic resin into said heated cavity;

sealing said sprue after the thermoplastic resin has been injected into said heated cavity;

hardening said injected thermoplastic resin in said heated cavity by applying a pressure thereto providing the dynamic modulus of elasticity of the thermoplastic resin at normal temperature and normal pressure; and cooling the thermoplastic resin in said cavity hardened by said pressurization to a removal temperature while reducing the pressure applied thereto so as to maintain the dynamic modulus of elasticity of the thermoplastic resin at the dynamic modulus of elasticity of the resin at normal temperature and normal pressure.

2. An injection molding method with stamping compression, wherein plasticized thermoplastic resin is injected into a plurality of cavities formed in a single mold apparatus through a sprue, runners, and gates, and. cooled with a mold clamping force applied to manufacture molded articles, comprising:

heating said cavities to a temperature at which the thermoplastic resin can be maintained in a molten state under normal pressure;

measuring at least a quantity of molten thermoplastic resin required for obtaining the articles to be molded;

injecting the measured and molten thermoplastic resin into said heated cavities;

sealing said sprue part after the required thermoplastic resin has been injected into said heated cavities;

hardening said injected thermoplastic resin in said heated cavities by applying a pressure thereto providing the dynamic modulus of elasticity of the thermoplastic resin at normal temperature and normal pressure; and cooling the thermoplastic resin in said cavities hardened by said pressurization to a removal temperature while reducing the pressure applied thereto so as to maintain the dynamic modulus of elasticity of the thermoplastic resin at the dynamic modulus of elasticity of the resin at normal temperature and normal pressure.

3. An injection molding method with stamping compression, wherein plasticized thermoplasitc resin is injected into a mold cavity through a sprue, a runner, and a gate, and cooled with a mold clamping force applied to manufacture a lens, comprising:

heating said cavity to a temperature at which the thermoplastic resin can be maintained in a molten state under normal pressure;

measuring at least a quantity of molten thermoplastic resin required for obtaining the lens to be molded;

injecting the measured and molten thermoplastic resin into said heated cavity;

sealing said sprue after the required thermoplastic resin has been injected into said heated cavity;

hardening said injected thermoplastic resin in said heated cavity by applying a pressure thereto providing the dynamic modulus of elasticity of the thermoplastic resin at normal temperature and normal pressure; and cooling the resin in said cavity hardened by said pressurization to a removal temperature while reducing the pressure applied thereto so as to maintain the dynamic modulus of elasticity of the thermoplastic resin at the dynamic modulus of elasticity of the resin at normal temperature and normal pressure.

4. An injection molding method with stamping compression wherein plasticized thermoplastic resin is injected into a plurality of cavities formed in a single mold apparatus through a sprue, a runner, and gates, and cooled with a mold clamping force applied to manufacture lenses, comprising:

heating said cavities to a temperature at which the thermoplastic resin can be maintained in a molten state under normal pressure;

measuring at least a quantity of molten thermoplastic resin required for obtaining the lenses to be molded;

injecting the measured and molten thermoplatic resin into said heated cavities;

sealing said sprue after the required thermoplastic resin has been injected into said cavities;

hardening said injected thermoplastic resin in said heated cavities by applying a pressure thereto which can provide the dynamic modulus of elasticity of the thermoplastic resin at normal temperature and normal pressure; and cooling the thermoplastic resin in said cavities hardened by said pressurization to a removal temperature while reducing the pressure applied thereto so as to maintain the dynamic modulus of elasticity of the resin at the dynamic modulus of elasticity of the thermoplastc resin at normal temperature and normal pressure.

* * * * *